United States Patent [19]

Kumar et al.

[11] Patent Number: 4,930,600
[45] Date of Patent: Jun. 5, 1990

[54] INTELLIGENT ON-BOARD RAIL LUBRICATION SYSTEM FOR CURVED AND TANGENT TRACK

[75] Inventors: Sudhir Kumar; Shiv R. Kumar, both of Westmont, Ill.

[73] Assignee: Tranergy Corporation, Westmont, Ill.

[21] Appl. No.: 274,326

[22] Filed: Nov. 21, 1988

[51] Int. Cl.$^5$ .............................................. B61K 3/00
[52] U.S. Cl. ..................................... 184/3.2; 184/3.1; 184/6.1; 184/6.4; 184/108; 104/279; 198/500
[58] Field of Search ......................... 184/3.2, 3.1, 2, 6, 184/6.1, 6.4, 7.4, 108, 109; 104/279; 198/500

[56] References Cited

U.S. PATENT DOCUMENTS

| | | | |
|---|---|---|---|
| 2,455,847 | 12/1948 | Winther | 184/35 |
| 3,195,681 | 7/1965 | Hirata | 184/3.2 |
| 4,368,803 | 1/1983 | Dombroski et al. | |
| 4,393,957 | 7/1983 | Hawthorne | |
| 4,537,285 | 8/1985 | Brown et al. | |
| 4,711,320 | 12/1987 | Dombrowski et al. | |
| 4,726,448 | 2/1988 | Schroeder et al. | |

Primary Examiner—Stephen F. Husar
Assistant Examiner—Alan B. Cariaso
Attorney, Agent, or Firm—Kinzer, Plyer, Dorn, McEachran & Jambor

[57] ABSTRACT

In railroad operations, a method and apparatus for optimizing on-board rail lubrication for both curved and tangent track. The apparatus is mounted on the car body of the last locomotive of a locomotive consist behind the last axle. A lubricating device applies two different lubricants, one on the crown of the rail and the other on the gage side. The amount and type of the crown lubricant are chosen such that the crown lubricant is totally consumed by the passage of the train wheels. The amount of application of the two lubricants is controlled by a microprocessor. A new sensor has been devised which measures degree of rail curve and estimates the angle of attack of the wheel on the rail by converting lateral displacement into either of the two quantities. This value is provided to the microprocessor. Other sensors measuring speed, temperature, humidity, etc. provide input signals to the microprocessor. This invention not only reduces the friction coefficient between the wheel flanges and the rail but also reduces the forces between the wheel flanges and the rail. Both rail and wheel wear are reduced while simultaneously also reducing the fuel consumed in the train.

28 Claims, 10 Drawing Sheets

FIG. 8 SECTION 8 - 8

INTELLIGENT ON-BOARD RAIL LUBRICATION SYSTEM FOR CURVED AND TANGENT TRACK

BACKGROUND OF THE INVENTION

It has been known for a long time that lubrication between railroad wheel flanges and the gage sides of the rails reduces wear of the rail and the wheel flanges on curves. Recent field tests have indicated that significant reductions of train resistance and savings of fuel consumption can be achieved when the gage sides of the rail are lubricated for both tangent and curved track. These fuel savings have been found to be between 5 and 30 percent. Other benefits that result from such lubrication are reductions in wheel rail noise and in the tendency of cars to hunt.

There are currently two methods of applying such lubrication. These are wayside lubrication on curves and onboard flange lubrication. The wayside method has been largely used in the U.S. The wayside lubricators are long bars with lubricant injection along their length from wayside lubricant tanks, powered by a pump. The lubricant is carried by the wheel flanges and rubbed on the gage side of the rail for several hundred to several thousand feet. The amount of lubricant injected through the bars is adjusted mechanically depending on the sharpness and length of the curve. There are several problems because of which these lubrication systems are not the most suitable for application to curved and tangent track as needed today. These lubricators require regular staff to service and maintain the lubrication in remote areas where the track is laid out. They have frequent mechanical failures and apply lubricant only for a specified short distance. They apply too much lubricant near the lubricator resulting in several associated problems and too little lubricant away from the lubricators. Such lubricators are not suitable for application of lubricant to tangent track because too many of them will be needed for the whole track.

On-board flange lubricators consist of on-board lubrication kept in a locomotive or other powered car and applied through a nozzle or a similar device to wheel flanges of the locomotive. The application of the lubricant is triggered by the approach of the locomotive to a curve. These lubricators have a constant rate of lubrication and do not transfer lubricant from wheel to rail on tangent track much of the time because the flange is not rubbing against the gage side of the rail much of the time. It has been estimated that nearly 95% of the lubricant is thrown around and only 5% is used in the flange contact. While these lubricators are used by many railroads, they are not ideally suited for tangent track.

None of the lubricators available to date do the complete job demanded for both tangent and curved track. A very important aspect in which they are all quite deficient is that all of them attempt to reduce only the friction coefficient between the wheel flange and the rail. None of them attack at the root of the wear energy loss problem, which is the large force that is produced between the flange and the rail. In order to reduce wheel/rail wear and energy loss, it is necessary to reduce both the friction coefficient as well as the force with which the flange rubs on the rail.

As discussed earlier, rail gage and wheel flange lubrication has been found to be beneficial in terms of reduction of wheel/rail wear as well as reduction of fuel consumption when such lubrication is applied on curved as well as tangent track. There are a number of problems, however, that need to be resolved for proper lubrication of the wheel and rail. None of the systems available to date apply the lubricant correctly and effectively on tangent track. None of them control and change the amount of lubricant with the tonnage being hauled, the angle of attack of the wheel on the rail and the environmental conditions such as temperature. All lubrication systems to date are aimed at reducing the friction coefficient of the flange and the rail. None of them are aimed at reducing the force with which the flange rubs the rail. To get around the above problems, most lubricators end up applying too much lubricant. This results in environmental pollution as well as loss of adhesion for the locomotives and growth of undetected internal fatigue cracks in the rail which can be disastrous.

A difficulty in achieving some of the above-stated considerations is that there are conflicting requirements between good performance of the locomotive wheels and good performance of the freight car wheels. The locomotive wheels require a high level of adhesion or friction and therefore need little or no lubrication, and the car wheels require adequate lubrication to reduce the wheel/rail contact friction.

SUMMARY OF THE INVENTION

The ideal lubricator should be able to achieve correct levels of lubrication efficiently on both tangent and curved track. It should reduce the wheel flange force on the rail as well as its friction coefficient. To accomplish this will require the application of separate lubricants of different characteristics to the rail crown and the gage side. The rate of lubrication should be controlled by the wheel angle of attack, the train speed, ambient temperature, the size of the train, rain or other environmental factors, and the physical/chemical properties of the lubricants. The lubricants should be applied in such a way that they result in minimum environmental pollution and minimum loss of traction of the locomotive or other tractive wheels. Ideally, both lubricants should be applied after the passage of the tractive wheels, and the rail crown lubrication should be applied in small enough quantities that it is consumed by the passage of the train applying it. Too much lubricant is bad because it leads to undetected internal rail fatigue and crack growth, resulting in sudden lateral fracture of the rail and catastrophic accidents. Too much lubricant is also environmentally unsound. The present invention achieves all of the above objectives through proper design, measurement of relevant parameters, and control through a microprocessor system.

More particularly, this invention is an intelligent on-board rail/wheel lubrication system which works effectively on both tangent and curved track. The system uses a separate, special lubrication wheel for each rail. The flanges of the lubrication wheels maintain continuous contact with the respective rail gage sides in a tangential manner. The system reduces the wheel/flange friction coefficient as well as the force with which the flange presses against the rail gage side. This is done for all car wheels (but not tractive wheels), thereby reducing fuel consumption and rail/wheel wear. It also reduces rail fatigue crack growth. It achieves all this by optimum application of two lubricants through microprocessor control.

The same device can achieve the correct lubrication for both curved and tangent track. It lubricates simultaneously (or separately as needed) the crown of the rail with one lubricant and the gage side of the rail with another lubricant. The lubricants are applied by a special lubricating wheel mounted on the last locomotive of the locomotive consist, past its trailing axle. A separate unit can also be mounted on the lead locomotive, if desired, for flange only lubrication.

The amounts of the two lubricants applied are controlled by a microprocessor and a number of operational parameters of the train. These parameters include train size, angle of attack of the wheels on the rail, train speed, temperature, humidity and rheological characteristics of the lubricants being used. A computer algorithm written in the form of a flow chart is given and can be utilized for the program in any desired language.

The system measures the degree of curve of the track and/or the angle of attack a truck wheel would make with the rails. It is based on an initial calibration for each different make locomotive on which it is installed. This input is used by the lubrication system and can be used for other purposes such as controlling the angle of attack of the locomotive truck wheels when such control is permitted.

The system provides control of the amount of each lubricant for each rail. It applies a minimal amount of lubricants on tangent track and track with less than a two degree curve. The amounts of lubricant applied increase with a number of parameters including train speed, train size and degree of curve up to a certain maximum value (six degrees is the default value). Environmental factors and lubricant characteristics are also included as control parameters.

The lubricant used for the rail crown contains only organic materials. There are no solid materials in it. It is a liquid lubricant or emulsion which does not leave any residue on the surface after it is used up. The flange lubricant is, however, of a more conventional type, which includes oils, soaps and solid lubricants like those based on graphite, molybdenum, etc.

The rail crown lubricant quantity is controlled by the microprocessor to be just enough so that it is used up (i.e., combusted) by the wheels of the whole train when the train has passed. No lubricating residue is left on the rail crown after train passage so that adhesion of the locomotive wheels of the next train is not negatively affected. The flange lubrication, however, is expected to leave a small residue for use by the next train coming on those tracks.

DETAILED DESCRIPTION OF THE INVENTION

Figure 1:
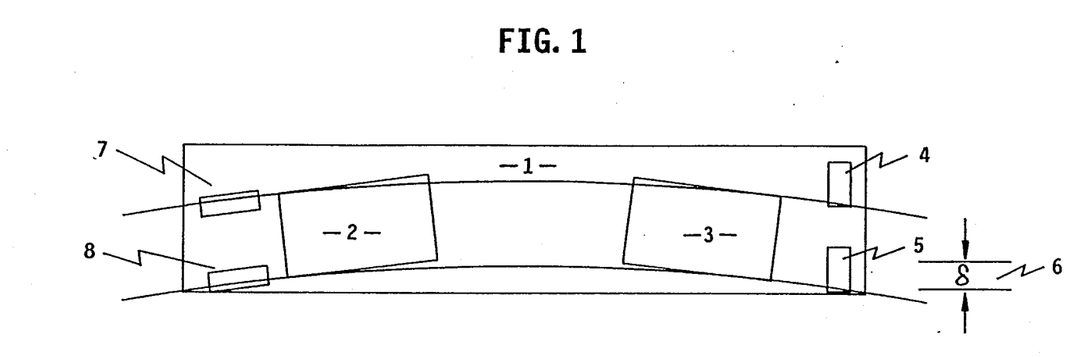
FIG. 1 is a schematic plan view of the last locomotive of the locomotive consist of a train, showing the location of two lubrication devices, one for each rail, attached to the locomotive car body.

In a train having all the locomotives located at the front end, the present invention is intended to be mounted on the last locomotive, behind its last tractive wheel set. If the train is very long and two or more sets of locomotives are located at several positions, this invention will be mounted on the last of each set of locomotives. The last locomotive 1 is shown schematically in FIG. 1, along with two trucks 2, 3 and two lubricating devices 4, 5 of this invention. The lubricating devices are mounted on the locomotive car body, one for each rail. In FIGS. 1 and 2, the front of the locomotive is at the left.

Each lubricating device has a wheel which rides on the rail with its flange spring-biased into constant contact with the rail gage side. The spring permits lateral movement of the device as needed. This movement $\delta$ is indicated at 6 on the diagram for curved track in FIG. 1. For tangent track this movement will be minimal.

Figure 2:
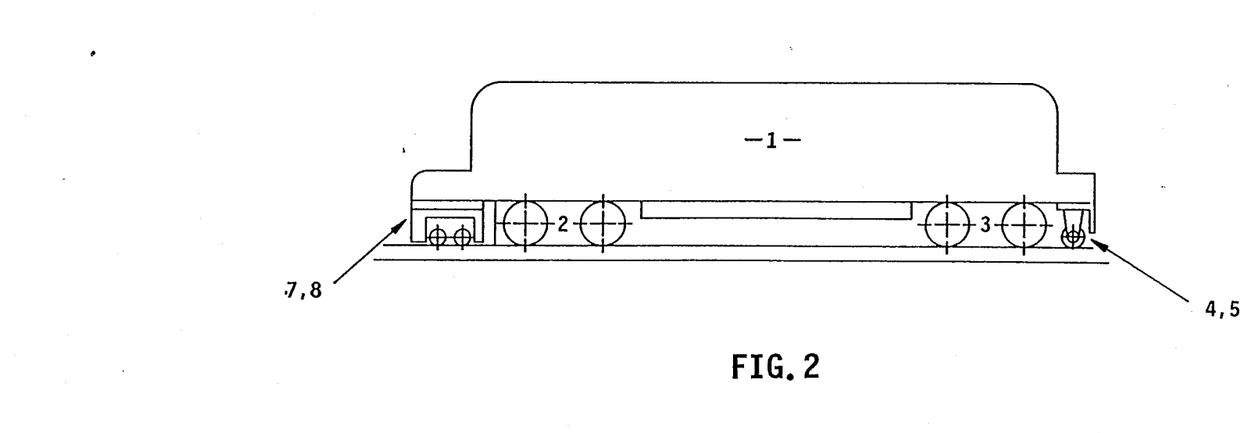
FIG. 2 is a schematic side elevation of the locomotive of FIG. 1.

For best operation of the train, it is desirable to operate this invention in conjunction with rail cleaning devices which are installed in the front of the lead locomotive. If there is only one locomotive, then both the rail cleaning and lubricating devices will be mounted on the same locomotive, as in FIGS. 1 and 2. The front cleaning devices 7, 8 are intended for cleaning the rail crown, and the trailing devices 4, 5 are intended for lubricating the rails for the trailing freight or passenger cars. The cleaning devices disclosed in U.S. Pat. No. 4,781,121, issued Nov. 1, 1988 are preferred.

Figure 3:
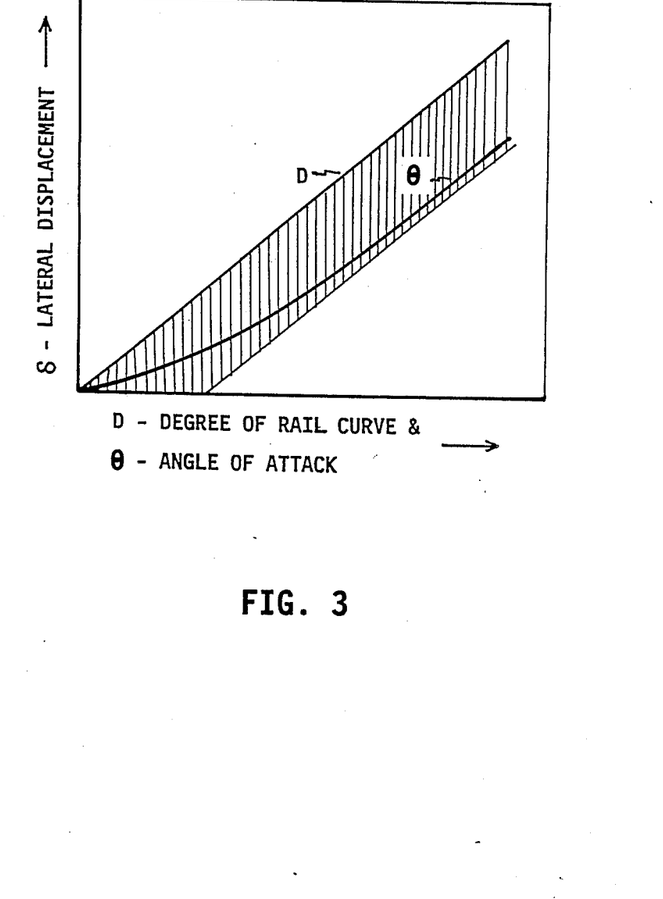
FIG. 3 shows qualitatively a relationship between lateral displacement ($\delta$ or delta) of the device wheel with respect to the degree of the rail curve (D) and the angle of attack ($\theta$ or theta).

FIG. 3 shows a typical functional relationship between the lateral displacement $\delta$ versus both the degree of the curve D and the angle of attack $\theta$. It can be shown theoretically that $\delta$ is directly proportional to D. The angle of attack curve as shown in FIG. 3 can, however, lie at different positions in the shaded area depending upon the locomotive and track parameters. The parameters affecting the above relations are the type of truck, the distances between the truck centers and truck axles of the trailing truck, distance of the devices 4, 5 from the truck center and the wheel rail gage clearance. Therefore, for each different design locomotive a separate set of curves shall exist. This functional relationship will be utilized by measurement of $\delta$ and calculation of D and – in a microprocessor for control of lubrication.

For a given train the amount of lubricants applied will be a certain minimum for tangent track and small degree curves (default value of two degrees). It will increase linearly with the degree of curve up to a certain maximum (default value of six degrees) and stay constant beyond that Other functions for lubrication application can also be utilized. Thus, the amounts of lubricants applied will be adjusted continually depending on the track curvature and the angle of attack of the wheel on the rail.

Figure 4:
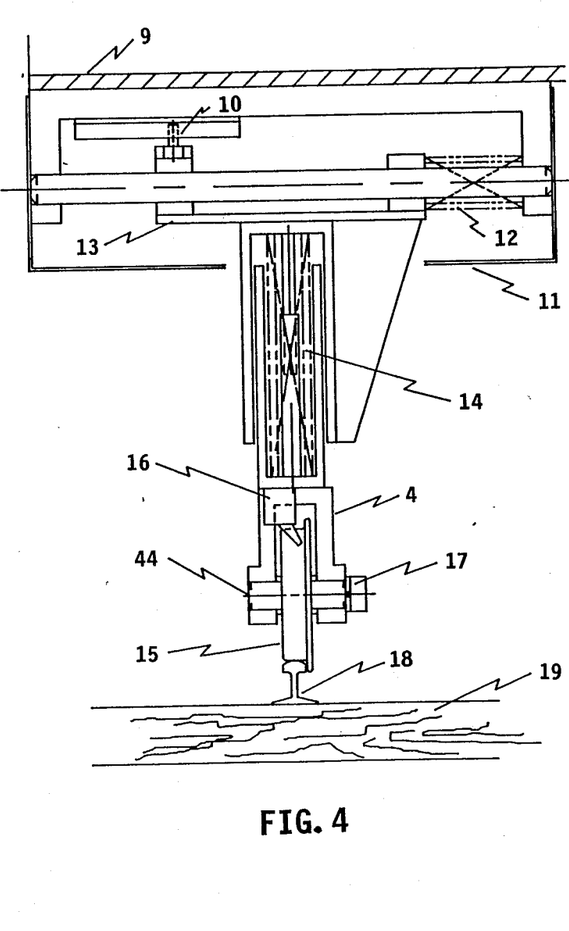
FIG. 4 is a rear elevation view of a lubricating device mounted on the locomotive body with the lubricating wheel flange always contacting the rail.
Figure 5:
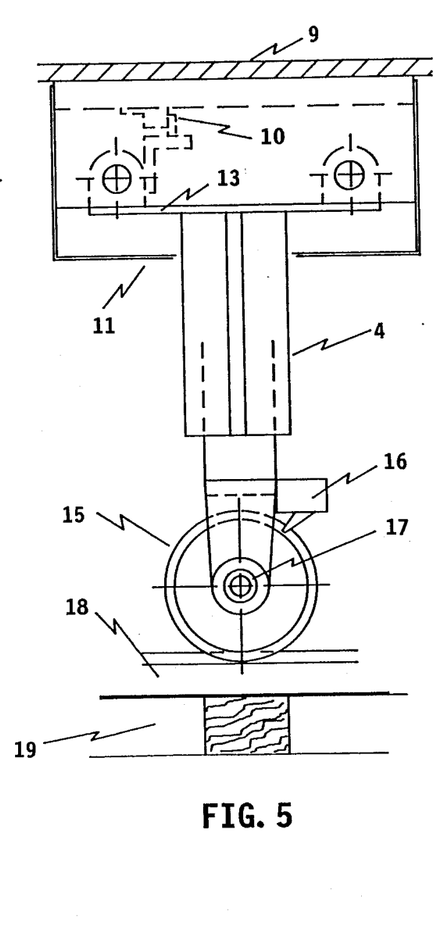
FIG. 5 is a side elevation view of the device mounted on the car body.

FIGS. 4 and 5 show an overall rear and side view of one lubricating device 4 having a lubricating wheel 15 rotatably mounted in a yoke or frame. The device 4 is mounted on the locomotive car body 9. Only one device mounted for the left rail 18, on ties 19, is shown in the drawings. A similar device is mounted on the right side with its wheel and flange contacting the right rail. Although not shown in FIGS. 4 and 5, the vertical wheel support structure can be raised up and folded inwardly when convenient or necessary.

The linear position of the device is registered by linear position indicators 10. These sensors, one on each lubricant dispensing unit on each rail, give the value of the lateral position and displacement δ discussed earlier in FIG. 3. Assuming the displacement from a neutral position in the right direction as positive, the average of the readings of the sensors on the left and right sensors gives the net lateral displacement. For good quality tangent track, this reading will be nearly zero. It is estimated that for typical cases of two to six degree curves, the lateral displacement will be between one half and two inches. Such large displacements can be measured quite accurately and angle of attack can be determined continually in a reliable fashion.

A carriage 13 is enclosed inside a box-type enclosure 11. A light stiffness spring 12 with an average force of 50 to 300 pounds pushes the device laterally outward to ensure contact of the wheel flange with the rail at all times. A vertical tubular sliding guide with a spring and shock absorber arrangement 14 is in a compressed position to apply an average force of about 100 to 200 pounds to the yoke carrying the lubricating wheel 15. A lubricant dispensing unit 16 is mounted on the yoke to deliver and apply two different lubricants on the lubricating wheel. The dispensing unit includes lubricant reservoirs and pumps as explained more fully below. A device such as a tachometer 17 is mounted on the axle 44 of the wheel 15 to measure the wheel speed while the train is moving. This is also provided as an input to the microprocessor for control of the lubricant.

Figure 6:
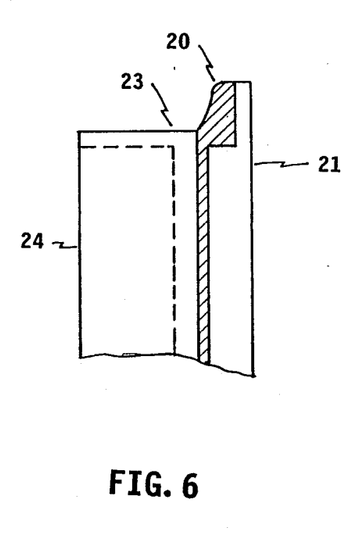
FIG. 6 shows a composite wheel profile that could be used for the lubricating wheel.
Figures 7, 8:
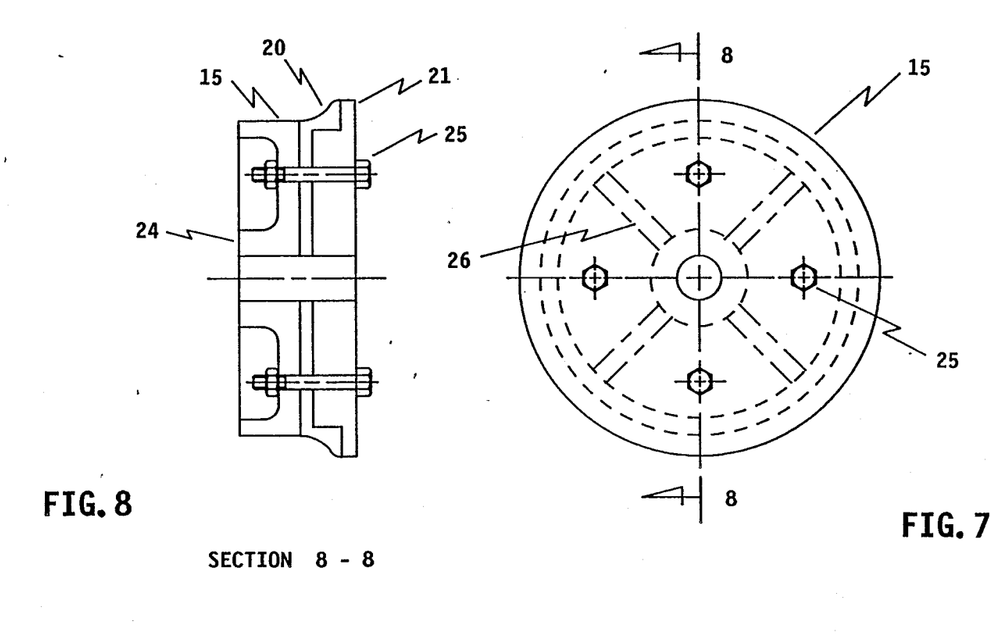
FIG. 7 shows one design of the lubricating composite wheel.
FIG. 8 is a section taken along line 8-8 of FIG. 7.

In order to apply the lubricant to the rail on a larger surface, it is desirable to have a large contact area of both the lubricating wheel tread and its flange. This requires a more compliant material which is still hard and wear resistant. This material should be compatible with lubricants and it should be impact and chip resistant. While different wheel designs, shapes and materials can be utilized for such purpose, one possible shape of a composite wheel profile is shown in FIG. 6. It has an inner metallic, possibly steel plate 21, and an outer cylindrical portion 24 made of hard plastic or aluminum, sandwiching an insert 20 made of another hard plastic or elastomer which is highly wear resistant and lubricant compatible, such as neoprene. The design of a full wheel of this nature is shown in FIGS. 7 and 8 where bolts 25 are used for holding the plastic insert 20 between the inner plate 21 and the outer cylindrical portion 24. Spoke-type ribs 26 can also be used as stiffeners for the outer part of the wheel.

The lubricating wheel 15 can be of many types. It should, however, provide large contact area between the wheel and the flange. Its surface is not necessarily smooth. It can have tiny pockets or cavities of different shapes to contain the lubricant and apply it to the rail when pressed against it.

Figure 9:
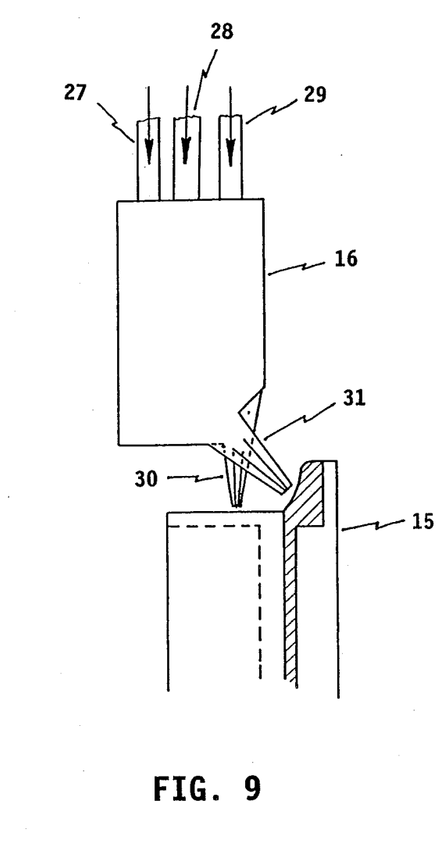
FIG. 9 is an enlarged front elevation view of the lubricant dispensing unit with two lubricants being applied to the lubricating wheel; one to the flange, and the other being sprayed on the tread of the wheel.

FIG. 9 shows the dispensing unit for the two lubricants being applied to the lubricating wheel through two different nozzles. Lubricant one enters through a tube 27 and lubricant two enters through another tube 28, whereas compressed air utilized in the applicator enters through tube 29. Lubricant one is applied through nozzle 30 to the tread of the lubricating wheel. This lubricant is expected to be less viscous and can therefore be actually sprayed onto the lubricating wheel tread. Lubricant two is more viscous and of the conventional type of rail lubricants and is therefore squeezed through nozzle 31 onto the flange of the lubricating wheel.

Figure 10:
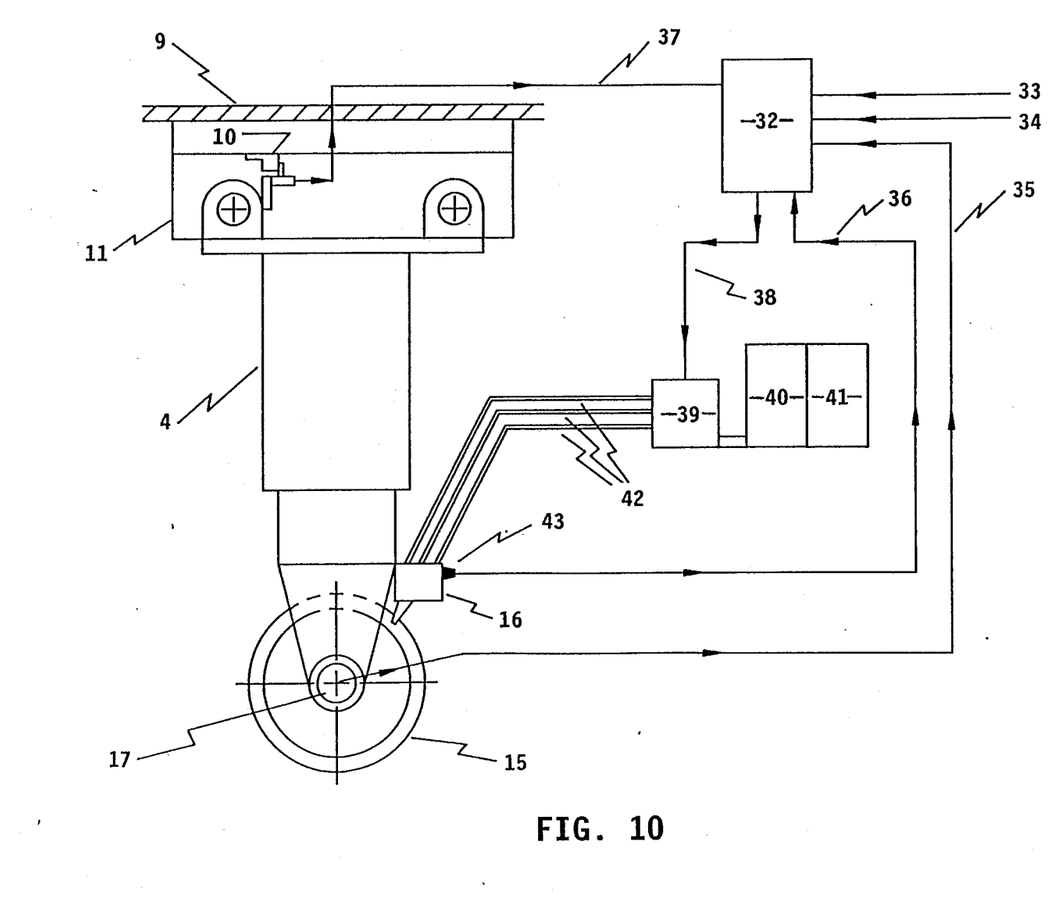
FIG. 10 is a schematic circuit diagram of the microprocessor controller for the application of the two lubricants to the lubricating wheel.

FIG. 10 shows the controller system for the application of the two lubricants to the lubricating wheel. There are a number of inputs provided to the microprocessor 32 which controls both lubricants. First, electrical power circuits 33 are provided for activating the microprocessor. The number of axles and average axle load, or the tonnage of the train being carried is provided from the locomotive computer or as manual input 34 into the microprocessor. The train speed can be provided by the locomotive computer or can be provided directly from the tachometer 17 through line 35. A temperature sensor 43 mounted on the lubricant dispensing unit 16 provides the input of temperature through line 36. The linear position sensor 10 provides the input of linear position through line 37 which is then converted by the microprocessor 32 into the degree of the curve or the angle of attack, whichever is preprogrammed. This conversion is made according to the relation of FIG. 3 which is available to the microprocessor in the form of a database maintained in an electronic storage device. Additional sensors such as humidity and wind speed could also be provided as inputs to the microprocessor.

Based on these inputs the microprocessor computes the amounts of lubricants to be dispensed per second and sends appropriate control signals through line 38 to the compressor pumps 39. These compressor pumps operate to compress lubricant one and lubricant two in two chambers 40, 41. Three supply lines connected to the compressor pumps 39 and leading to the lubricant dispensing unit 16 apply the two lubricants to the lubricating wheel 15. The lubricating wheel in turn transfers these lubricants to the rail crown and the gage side in the process of rolling.

There will be a number of safety sensors, not shown in the diagrams, which will stop the application of the lubricant or pumping of the lubricant. Situations when it will be necessary to do so include: the lubricating wheel is not in contact or loaded in contact with the rail; or when there is already excess lubricant on the rail and no more lubrication is required; or if it is raining heavily and excess lubrication is not necessary.

Figure 11:
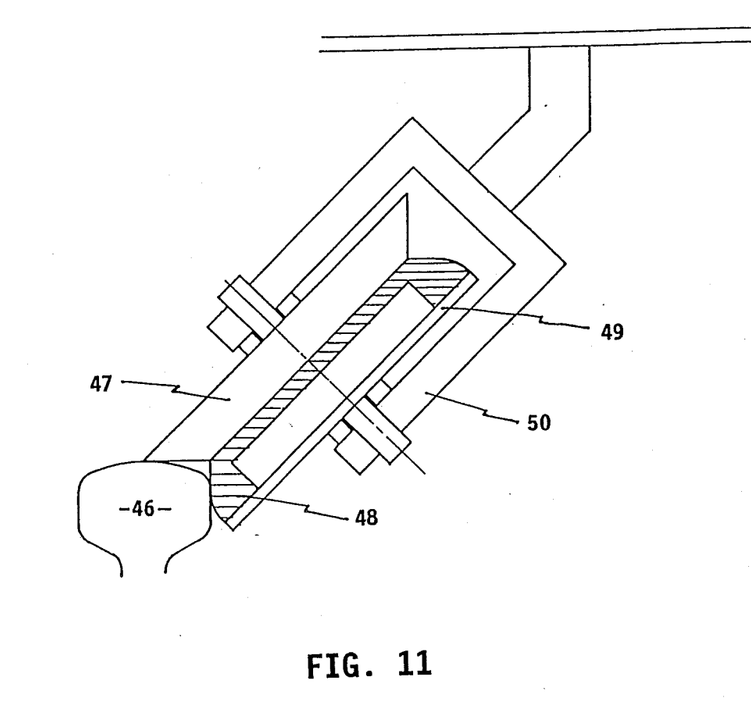
FIG. 11 is a front elevation view of an alternate embodiment of the lubricant dispensing unit, having an inclined orientation of the lubricating wheel.

The lubricating wheel design suggested earlier is preferred. It has a conventional type wheel profile. However, an alternate approach to application of lubricant is shown in FIG. 11. This approach uses an inclined orientation of the lubricating wheel on the rail 46. The lubricating wheel is made of three parts: one side of metal 47, or hard plastic, and the other side of an elastomeric or neoprene insert 48, and a backing plate of metal 49. The lubricating wheel is mounted through a yoke 50, inclined at an angle.

Figure 12:
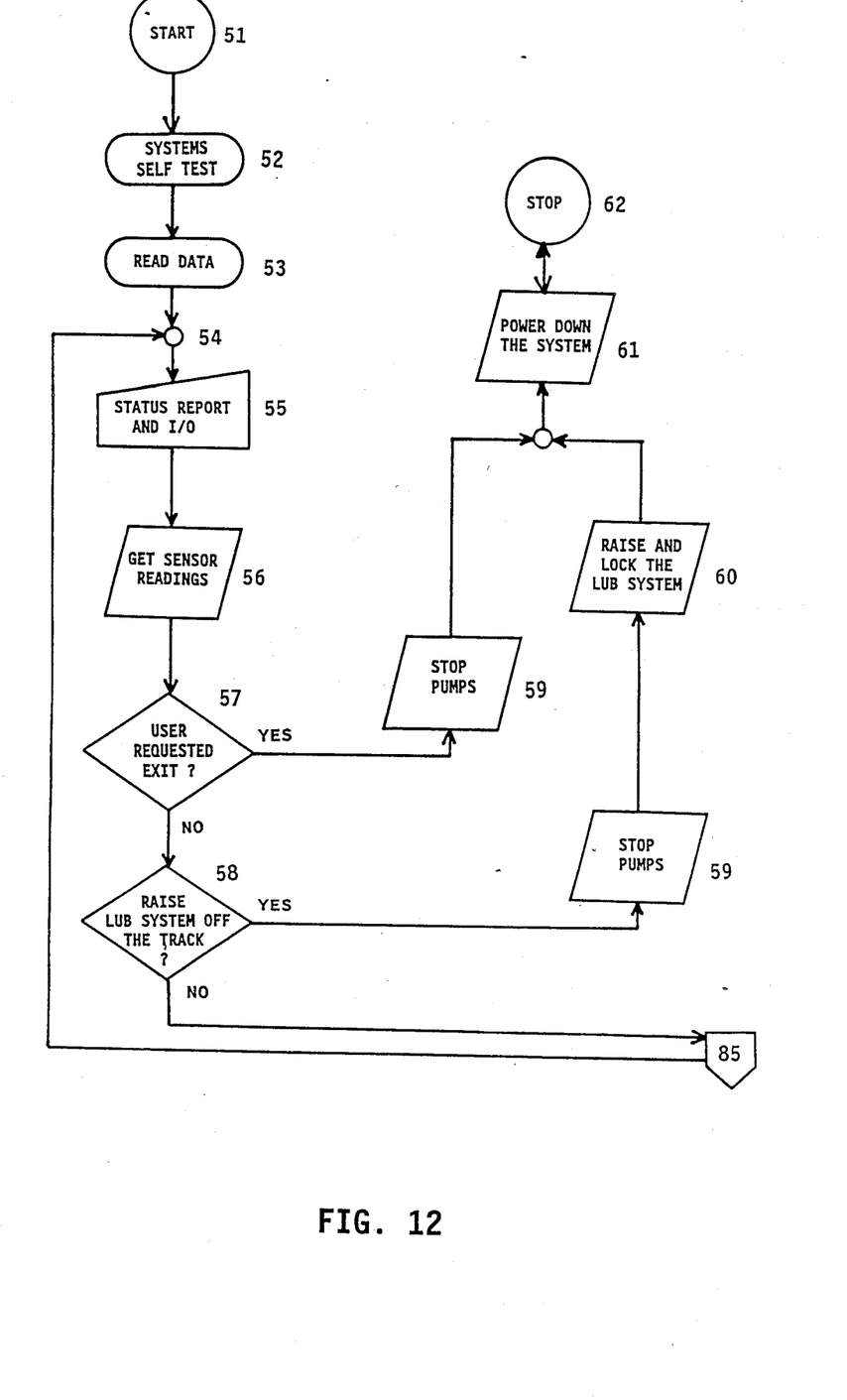
FIGS. 12 and 13 show a computer algorithm for start up, control and shut down of the continually adjusted lubrication system.
Figure 13:
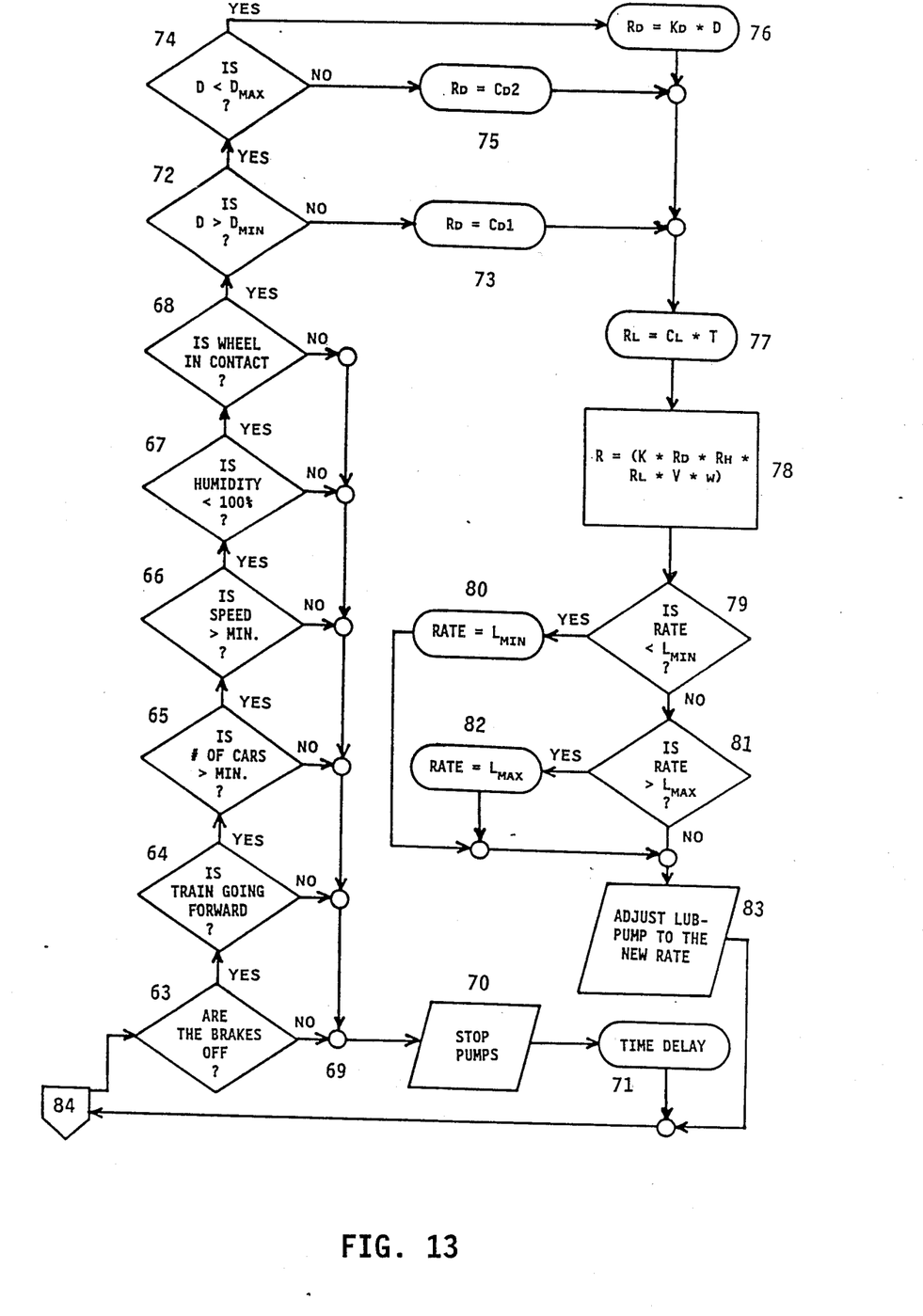

A computer algorithm is given in FIGS. 12 and 13 for start up, control and shut down of the lubrication system. It is briefly discussed below. Reference numbers 51 through 83 mark the stages of computation and control in FIGS. 12 and 13. Numbers 84 and 85 are page connectors which are merely used for connection of the flow lines in FIGS. 12 and 13, and serve no other function in the algorithm.

At steps 51 and 52 the lubrication system powers up and executes a system self test to ensure proper communication with its sensors, data storage devices and pump systems, among other things. The system then reads (53) the data constants which include:

K—An equipment factor dependent on the lubricant dispensing unit characteristics
$K_D$—A curvature constant
$D_T$—Delay time before next set of sensor readings
$C_L$—Lubrication characteristics constant
$D_{min}$—Minimum default degrees of curve
$D_{max}$—Maximum default degrees of curve
$C_{D1}$—Minimum lubrication rate parameter for tangent track and shallow curves
$C_{D2}$—Maximum lubrication rate parameter for sharp curves
$V_{min}$—Minimum velocity specified for lube system to operate lube pumps
$N_{min}$—Minimum number of car axles for lubrication
$L_{max}$—Maximum allowable lubrication rate
$L_{min}$—Minimum allowable lubrication rate At this point the program enters a loop, indicated by the small circle 54. Then the program control goes to status report and input/output 55. The program shows output status on a screen in the locomotive cab for the engineer to see. The program may prompt for manual input of tonnage of the train, or the number of axles N and the average axle load W. At 56 values of the various sensor readings are supplied to the microprocessor. These include the displacement $\delta$ (which the computer converts to angle of attack D or degree of curvature $\theta$, as explained above), the train velocity V, and the ambient air temperature T and humidity.

The program next asks the engineer if the lube system is to be turned off 57 and be raised off the track 58, 59, 60, or if the lube system is just to be turned off. At any time the engineer may invoke an interrupt which would turn off the lube pumps and abort the program immediately, 57, 59, 61, 62.

If the engineer does not request a shut down, the system goes through six decision parameters. It checks if the brakes are off 63, if the train is going forward 64, if the number of cars is above $N_{min}$ 65, if the present train speed is above $V_{min}$ 66, if the percent humidity is less than 100% 67, and if the lube wheel is in contact with the rail 68. If the answer to any of these questions is no, the controller stops the lubricant pumps 70. The system then waits for the time delay DT 71 before returning to repeat the loop at 54.

If the answer to all six decision parameter questions 63–68 is yes, decision about the influence of the degree of curve on lubrication is implemented at 72 and 74. There is a minimum lubrication rate parameter $C_{D1}$ for tangent track and shallow curves with degrees smaller than $D_{min}$, 73. There is also a maximum lubrication rate parameter $C_{D2}$ for sharp curves with degrees greater than $D_{max}$, 75. For values of degrees between $D_{min}$ and $D_{max}$ the curve factor $R_D$, for curves, changes linearly as a constant $K_D$ times degree D, as shown at 76. Lubricant factor $R_L$ affected by lubrication characteristic constant $C_L$ and temperature T is calculated at 77. Humidity factor $R_H$ is 0 when the humidity is 100% or 1 when the humidity is less than 100%. Alternately, the humidity factor could be adjusted between 0 and 1 for humidities less than 100%.

The lubrication rate R is calculated at 78, based on the formula: $R = K*R_D*R_H*R_L*V*N_w$ A minimum and a maximum value of lubrication rate are used as default rates. If the calculated rate is in between these values, the calculated value is used; otherwise, the default values are used for adjusting new lubrication pump rates. This is shown in steps 79–82. The pump speed is adjusted accordingly at 83.

After this a new loop of status report and input/output etc. starts at 54. The time gap between adjustment of lubrication rates will depend on the speed of sensor readings, which may require a few seconds.

Thus, a nearly continuous adjustment of lubrication rate, which takes into account all the important parameters, is achieved. It will be understood that the process just described produces a single lubrication rate R. In the preferred embodiment there are actually four rates R that need to be calculated, two rates for the crown and gage side lubricants on two rails. Some of the constants for the crown and gage side lubricants will, of course, be different and they will have to be read in separately. Similarly the degree of curvature or angle of attack may differ for the two rails so this will have to be accounted for. But the overall plan is evident from FIGS. 12 and 13.

As mentioned earlier, one of the important aspects of the present invention is the reduction of the lateral forces with which the car wheel flanges hit the gage side of the rails. Lateral forces result from a combination of the wheel/rail friction and the angle of attack between the wheel flanges and the rail. Since the wheel is not perfectly parallel to the rail, the wheel is normally tending to roll off of the rail. This tendency, combined with the adhesion of the wheel tread to the crown of the rail, produces the lateral force. The wheel flange, of course, counteracts the lateral force to prevent derailment. It should be noted that there is generally some angle of attack between a wheel and the rail. On curved track, it is due to curvature in the rails. On tangent track, it can arise due to slack in the truck rotation between the rails.

The present invention reduces the lateral force by lubricating the rail crown, thereby reducing for all cars the coefficient of friction between the wheel tread and the rail crown. Thus, even though the wheel is rolling at an angle to the rail, it cannot produce as great a lateral force because it slips rather than adheres. And since the amount of lubricant applied to the rail head is carefully controlled, the lubricant is exhausted by time the last car passes a given point. The rail crown is left clean for the tractive wheels of the next locomotive to use those tracks.

It is also important to note that the correct amount of lubricant is different for any given point on the track. As the train carries the lubricating device down the track, the correct amount of lubricant is constantly changing. The microprocessor of the present invention takes all the factors into account and orders the correct application of lubricant at each point of the track.

Whereas a preferred form of the invention has been shown and described, it will be realized that modifications may be made thereto without departing from the scope of the following claims. For example, instead of using the flanged lubricating wheel shown, a notched wheel could be used. Or the lubricating wheel could be left out and the lubricant applied directly to the rail.

We claim:

1. A method of operating a train on railroad track with reduced train resistance, comprising the steps of applying a continuous film of non-volatile, organic lubricant which is non-freezing under operating conditions to the crown of at least one track rail at a point behind the last tractive wheels of the train's locomotive, the lubricant being applied on both tangent and curved track, and applying a second lubricant to the gage side of at least one rail.

2. The method of claim 1 further comprising the steps of calculating the amount of lubricant required to be applied at a given point of the track such that substantially all of the lubricant is consumed by the passage of the train, generating a control signal representative of said amount and using said control signal to actuate the lubricant dispensing device to apply said amount of lubricant to the rail crown.

3. The method of claim 2 wherein the step of calculating is performed by a microprocessor.

4. The method of claim 2 wherein the step of calculating is further characterized by measuring and accounting for the angle of attack of the train wheels with respect to the rails at a particular point on the track.

5. The method of claim 2 wherein the step of calculating is further characterized by measuring and accounting for the train's speed and tonnage being hauled.

6. The method of claim 2 wherein the step of calculating is further characterized by measuring and accounting for the ambient air temperature and humidity.

7. The method of claim 1 wherein the lubricating device includes a lubricating wheel in contact with a rail and the step of applying lubricant is characterized by applying lubricant to the lubricating wheel which transfers it to the rail.

8. An on-board lubricating device for lubricating a railroad track rail, the device to be mounted on the last locomotive of a locomotive consist behind the last tractive wheel, comprising:
a frame adapted for mounting on the locomotive car body;
a lubricating wheel having a tread and a flange;
means connected to the frame for rotatably mounting the lubricating wheel such that the wheel tread is in constant contact with the crown of the rail and the wheel flange is in constant contact with the gage side of the rail; and
a lubricant dispensing unit mounted on the device for applying a first lubricant to the tread of the lubricating wheel and second lubricant to the flange of the wheel.

9. An on-board lubricating device for lubricating a railroad track rail, the device to be mounted on the last locomotive of a locomotive consist behind the last tractive wheel, comprising:
a frame for mounting on the locomotive car body;
a carriage mounted for lateral sliding motion on the frame;
a spring biasing the carriage toward the field side of the rail;
a yoke connected to the carriage;
a flanged lubricating wheel mounted for rotation in the yoke in contact with the rail; and
a lubricant dispensing unit mounted on the yoke for applying a first lubricant to the tread of the lubricating wheel and second lubricant to the flange of the wheel.

10. The apparatus of claim 9 further characterized in that the yoke is connected to the carriage by means of a spring and damper.

11. The apparatus of claim 9 further comprising a linear position indicator attached to the carriage for providing a signal representative of lateral displacement of the carriage from a base position wherein the lubricating wheel has an angle of attack of zero with respect to the rail.

12. The apparatus of claim 9 further comprising a microprocessor for calculating the amount of lubricant required to be applied at a given point of the track such that substantially all of the lubricant is consumed by the passage of the train, the microprocessor generating a control signal representative of said amount, said control signal actuating the lubricant dispensing device to apply said amount of lubricant to the lubricating wheel.

13. The apparatus of claim 9 wherein the lubricant dispensing unit further comprises at least one reservoir and pump for ejecting the lubricant.

14. The apparatus of claim 9 wherein the lubricating wheel comprises a composite structure including a metallic plate, a cylindrical portion defining the tread of the wheel and a wear resistant, lubricant-compatible insert between the plate and cylindrical portion, the insert defining the portion of the wheel flange in contact with the rail.

15. A method of measuring the angle of attack between a wheel of a moving railroad car and a rail, comprising the steps of:
mounting a measuring wheel on the railroad car body, in constant contact with a rail;
establishing a functional relationship between the lateral displacement of the measuring wheel and the angle of attack, said relationship depending on the location of the measuring wheel relative to the car truck centers and the distance between the truck centers;
measuring the lateral displacement of the measuring wheel from a base position wherein the lubricating wheel has an angle of attack of zero with respect to the rail; and
determining the angle of attack by consulting the functional relationship to find the angle of attack corresponding to the measured lateral displacement.

16. Apparatus for measuring the angle of attack between a wheel of a moving railroad car and a rail, comprising:
a measuring wheel mounted on the railroad car body, in constant contact with a rail;
electronic database storage means containing a functional relationship between the lateral displacement of the measuring wheel and the angle of attack, said relationship depending on the location of the measuring wheel relative to the car truck centers and the distance between the truck centers;
means for measuring the lateral displacement of the measuring wheel from a base position wherein the lubricating wheel has an angle of attack of zero with respect to the rail; and
means for determining the angle of attack by consulting the functional relationship in said storage means to find the angle of attack corresponding to the measured lateral displacement.

17. A method of reducing the forces applied by the flanges of railroad car wheels on the rails, comprising the steps of disposing at least one lubricant dispensing device on the last locomotive of a locomotive consist and applying non-volatile, organic lubricant which is nonfreezing under operating conditions from said device to the crown of at least one track rail at a point behind the last tractive wheels of the locomotive, the lubricant being applied on both tangent and curved track.

18. The method of claim 17 further comprising the step of applying a second lubricant from said lubricant dispensing device to the gage side of said one track rail.

19. A method of lubricating railroad track rails using a lubricant dispensing unit mounted on the locomotive of a train, the lubricant dispensing unit having pumps for applying lubricant to the track rails at a determined rate, the rate being determined with the aid of a digital computer, comprising the steps of:
providing said computer with a database including,
an equipment factor K dependent upon the configuration of the lubricant dispensing unit,
a curvature constant $K_D$,
a lubricant characteristics constant $C_L$ dependent upon the physical properties of the lubricant,
the number of axles in the train N, and
the average tonnage being hauled per axle w;
repetitively measuring and providing to the computer variables including,
the degree of curvature of the track rails D,
the ambient air temperature T, and
the velocity of the train V;
repetitively calculating in the computer, at frequent intervals, factors including,
a curve factor $R_D$ based on the relation $R_D = K_D * D$,
a lubricant factor $R_L$ based on the relation $R_L = C_L * T$;
repetitively calculating in the computer, at frequent intervals, a lubrication rate R based on the relation $R = K * R_D * R_L * V * Nw$; and adjusting the speed of the dispensing unit pumps to dispense lubricant at the most-recently calculated rate R.

20. The method of claim 19 further characterized in that the computer database is also provided with,
a minimum default degrees of curve $D_{min}$,
a maximum default degrees of curve $D_{max}$,
a minimum lubrication rate parameter for tangent track and shallow curves $C_{D1}$,
a maximum lubrication rate parameter for sharp curves $C_{D2}$;
and wherein $R_D = C_{D1}$ if D is less than $D_{min}$, and $R_D = C_{D2}$ if D is greater than $D_{max}$.

21. The method of claim 19 further characterized in that the computer database is also provided with,
a minimum allowable lubrication rate $L_{min}$,
a maximum allowable lubrication rate $L_{max}$;
wherein $R = L_{min}$ if the calculated rate is less than $L_{min}$, and $R = L_{max}$ if the calculated rate is greater than $L_{max}$.

22. The method of claim 20 further characterized in that the computer database is also provided with,
a minimum allowable lubrication rate $L_{min}$,
a maximum allowable lubrication rate $L_{max}$; and wherein $R = L_{min}$ if the calculated rate is less than $L_{min}$, and $R = L_{max}$ if the calculated rate is greater than $L_{max}$.

23. The method of claim 19 further characterized in that prior to calculating the rate, the computer checks whether the train's brakes are off and if they are not, stops the pumps.

24. The method of claim 19 further characterized in that prior to calculating the rate, the computer checks whether the train is going forward and if it is not, stops the pumps.

25. The method of claim 19 further characterized in that the computer database is also provided with a minimum number of axles $N_{min}$, and prior to calculating the rate, the computer checks whether the number of train car axles N exceeds $N_{min}$ and if it does not, stops the pumps.

26. The method of claim 19 further characterized in that the computer database is also provided with a minimum speed $V_{min}$, and prior to calculating the rate, the computer checks whether the train speed V exceeds $V_{min}$ and if it does not, stops the pumps.

27. The method of claim 19 further characterized in that the computer database is also provided with the ambient air humidity, and prior to calculating the rate, the computer checks whether the humidity is less than 100% and if it is not, stops the pumps.

28. The method of claim 19 further characterized in that the computer database is also provided with a signal to indicate if the lubricant dispensing unit is in contact with the rail and prior to calculating the rate, the computer checks whether the dispensing unit is in contact with the rail and if it is not, stops the pumps.

* * * * *